(12) United States Patent
Noldus et al.

(10) Patent No.: US 9,961,061 B2
(45) Date of Patent: May 1, 2018

(54) NODE FOR USE BY A NETWORK, A SYSTEM FOR INTERCONNECTING MULTIPLE NETWORKS AND METHODS OF OPERATING THE NODE AND SYSTEM

(71) Applicant: Telefonaktiebolaget L M Ericsson (publ), Stockholm (SE)

(72) Inventors: Rogier August Caspar Joseph Noldus, Goirle (NL); Barbara Pareglio, Breda (NL); Erik Van Der Velden, Eindhoven (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 138 days.

(21) Appl. No.: 14/777,558

(22) PCT Filed: Mar. 18, 2013

(86) PCT No.: PCT/EP2013/055552
§ 371 (c)(1),
(2) Date: Sep. 16, 2015

(87) PCT Pub. No.: WO2014/146679
PCT Pub. Date: Sep. 25, 2014

(65) Prior Publication Data
US 2016/0072783 A1   Mar. 10, 2016

(51) Int. Cl.
*H04L 29/06* (2006.01)
*G06F 21/00* (2013.01)
(Continued)

(52) U.S. Cl.
CPC ............ *H04L 63/08* (2013.01); *H04W 4/005* (2013.01); *H04W 12/06* (2013.01); *H04L 63/0892* (2013.01)

(58) Field of Classification Search
CPC .... H04L 63/08; H04L 63/0892; H04W 4/005; H04W 12/06
See application file for complete search history.

(56) References Cited

U.S. PATENT DOCUMENTS

| | | |
|---|---|---|
| 2003/0139180 A1 | 7/2003 | McIntosh et al. |
| 2008/0167090 A1* | 7/2008 | Athalye ................. H04L 12/66 455/574 |
| 2008/0311956 A1* | 12/2008 | Taaghol ................ H04L 9/0841 455/558 |

FOREIGN PATENT DOCUMENTS

| | | |
|---|---|---|
| EP | 2536095 A1 | 12/2012 |
| WO | 2007114710 A2 | 10/2007 |

OTHER PUBLICATIONS

3GPP, "3rd Generation Partnership Project; Technical Specification Group Services and System Aspects; Feasibility study on the security aspects of remote provisioning and change of subscription for Machine to Machine (M2M) equipment (Release 9)", 3GPP TR 33.812 V9.2.0, Jun. 2010, 1-87.

(Continued)

*Primary Examiner* — Lisa Lewis
(74) *Attorney, Agent, or Firm* — Murphy, Bilak & Homiller, PLLC

(57) ABSTRACT

There is provided a method of operating a node (512, 520, 1102) for use by a first network (502, 504), the first network (502, 504) applies an authentication process to allow a subscriber access to a network, wherein authentication information used in the authentication process is derived using a key associated with a subscriber identity of a subscriber, the key being stored in either a location within the first network (502, 504) or external to the first network (502, 504). The method includes storing (400) information regarding the locations at which keys associated with subscriber identities are stored, receiving (402) a request for authentication (Continued)

information, the request indicating the subscriber identity to which the request for authentication information relates, retrieving (404) information regarding the location at which the key associated with the subscriber identity is stored using the subscriber identity, and routing (406) the request for authentication information according to the retrieved information.

13 Claims, 9 Drawing Sheets

(51) Int. Cl.
    *H04W 12/06*     (2009.01)
    *H04W 4/00*     (2018.01)

(56)     References Cited

OTHER PUBLICATIONS

Barriga, et al., "M2M Remote-Subscription Management", Enabling M2M Mobile Connectivity. Ericsson Review. XP-002686983, May 2, 2011, 1-6.

\* cited by examiner

| Network code: 655 01 | | |
|---|---|---|
| IMSI / IMPI | Authentication authority | UICC porting status |
| 655 01 123456789 | AuC | UICC not ported |
| 655 02 321654987 | AuC | UICC ported-out |
| 655 01 123456790 | Other network | UICC ported in |
| ... | ... | ... |
| 65501123456789@mnc01.mcc655.3gppnetwork.org | AuC | UICC not ported |
| 65502321654987@mnc02.mcc655.3gppnetwork.org | AuC | UICC ported out |
| 65501123456790@mnc01.mcc655.3gppnetwork.org | Other network | UICC ported in |
| ... | | |

Figure 6

| Mobile country code: 655 | | |
|---|---|---|
| IMSI / IMPI | Donor operator | Recipient operator |
| 655 02 123456987 | 655 01 | 655 02 |
| 655 01 123654789 | 655 02 | 655 01 |
| ... | | | ns
NODE FOR USE BY A NETWORK, A SYSTEM FOR INTERCONNECTING MULTIPLE NETWORKS AND METHODS OF OPERATING THE NODE AND SYSTEM

TECHNICAL FIELD

The present invention relates to a node for use by a network, a system for use in interconnecting multiple networks and methods of operating the node and system.

BACKGROUND

The transfer of subscribers between network operators (subscription porting) in a telecommunication system is becoming more popular and is occurring more frequently. This is a result of an increase in the number of communication services operators available due to the auctioning of additional frequency bands for communication. In view of this, it is becoming increasingly important to provide effortless and seamless transfer for subscribers between network operators (i.e. effortless and seamless subscription porting). In fact, ease of subscription porting may soon become an important, legally enforced requirement.

The transfer of subscribers between network operators is achieved by transferring ownership of the Universal Integrated Circuit Card (UICC), which is also known as the Subscriber Identity Module or SIM card. The UICC is fitted in User Equipments (UEs) such as mobile terminals, Machine-to-Machine (M2M) devices, etc. The use of e.g. Machine-to-Machine (M2M) communication with UICC communications devices is ever increasing. The current generation of Universal Integrated Circuit Card (UICC) communication is based on existing principles used in cellular and wireless communication networks. These networks include the Global System for Mobile Communications (GSM), a Third Generation (3G) system or a Fourth Generation (4G) system, such as the Enhanced Packet System (EPS), composed of the Long Term Evolution (LTE) access network and the Enhanced Packet Core (EPC) core network.

The aforementioned existing principles include the use of the UICC and the identification of a mobile operator from which the communication service is obtained through the International Mobile Subscriber Identity (IMSI) in the Universal Subscriber Identity Module (USIM) in the UICC. The UE (i.e. the mobile terminal, the M2M device, etc), reads the IMSI from the USIM and uses the IMSI to determine the operator to which the user of this UE is a subscriber.

In addition to containing the IMSI, the UICC also holds at least one authentication key $K_i$ that is used for authenticating the subscriber and allowing access by the UE to services provided by the network operator (such as voice calls, data sessions, etc).

The network operated by a network operator that "owns" a particular UICC typically comprises an Authentication Centre (AuC) in which authentication keys $K_i$ corresponding to those contained in the UICCs of its subscribers are stored. The authentication key $K_i$ is generally a 128 bit number. It is not possible to read or modify the $K_i$ in the UICC and it is not possible to extract the $K_i$ from the AuC.

There may be two authentication keys in the UICC. The first authentication key $K_i$ is contained in the USIM and is used in authentication for Circuit Switched (CS) access, Packet Switched (PS) access and EPS access. The second authentication key $K_i$ is contained in the IP Multimedia Services Identity Module (ISIM) and is used in authentication for IP Multimedia Services (IMS) registration. The ISIM is an optional application residing in the UICC. The UICC may have a USIM or may have both a USIM and an ISIM. Alternatively, the UICC may have a single authentication key $K_i$, which is shared between USIM and ISIM. This shared authentication key $K_i$ is used in authentication for CS access, PS access EPS access and IMS registration.

In some existing systems, the network comprises an AuC that contains the authentication key $K_i$ for the IMSI that is used in authentication for CS access and PS access, and a Home Subscriber Server (HSS) that contains one $K_i$ value that is used for EPS authentication and another $K_i$ value that is used for IMS authentication. In practical deployment, the HSS may have a single $K_i$ that is used for EPS authentication as well as for IMS registration.

If a subscriber moves from an original network operator to a new network operator, a new IMSI is required for the subscriber. This new IMSI is required to enable the UE to obtain services from the new network operator to which the subscription is ported.

Practically, a new IMSI is provided by replacing the UICC. This can be an inconvenient, time consuming, and even expensive process.

There exist methods that allow the IMSI to be changed without requiring the replacement of the UICC. These methods typically employ remote IMSI reprogramming. In particular, in the existing methods, the IMSI in a UICC is remotely reprogrammed, for example, using an Over-The-Air (OTA) remote UICC update technique. This reprogramming of the IMSI needs to be carried out by the original network operator. Once the IMSI is reprogrammed, the original network operator transfers the control over and the ownership of the UICC to the new network operator.

The remote reprogramming of the IMSI in the USIM application requires that the UICC supports the Universal Subscriber Identity Module (USIM) Application Toolkit (USAT). USAT comprises a set of generic utilities that are offered by the UICC and that enable applications installed on the UICC as well as applications installed on the UE itself to use data from the UICC and to execute services on the UICC.

In addition to the requirement of a new or reprogrammed IMSI in the UICC when the UICC is ported between network operators, it is also necessary for the new network operator to have knowledge of the authentication keys in the UICC in order for the UICC to be used to authenticate the subscriber to the new network.

However, in contrast to the IMSI, it is not possible to reprogram the $K_i$ in the UICC. Therefore, even though it is possible to reprogram the IMSI, it is currently still necessary to change the UICC for another UICC in order for the new network operator to have knowledge of a $K_i$ for use in future authentication processes.

Some techniques have been proposed that enable subscribers to transfer between network operators without changing the UICC. This is particularly important for M2M devices that are installed in remote locations since changing the UICC for these devices would be extremely costly and time-consuming. The article entitled "M2M Remote-Subscription Management", by L. Barriga, B. Smeets, and K. Sällberg, Ericsson Review, 2011, describes the desirability to be able to port a UICC from one operator to another and discusses the problems associated with the fact that it is not possible to reprogram the authentication key $K_i$ in the UICC.

3GPP TR 33.812 discloses methods for UICC portability that aim to solve the problem that, whilst the IMSI in a UICC may be reprogrammed, it is not possible to modify the $K_i$ on the UICC.

Some methods described in 3GPP TR 33.812 solve this problem by downloading an authentication key determined by a Home Network Operator to the UICC. In these methods, an initial authentication key $K_i$ is programmed in by the UICC manufacturer or by the network operator to which the UICC is initially associated. It is not possible to modify this initial authentication key $K_i$ and it has the same security aspects as the $K_i$ found in contemporary, regular UICCs. The initial authentication key $K_i$ is used for authentication to the network operator to which the UICC is initially associated. When the UICC is assigned to a new operator following the porting of a subscription, the new operator downloads its own authentication key to the UICC. The new operator's authentication key is then used for authentication. Since the new authentication key is downloaded to the UICC, it is arguable that it has a lower level of security than the $K_i$ of the contemporary, regular UICC.

Other methods disclosed in 3GPP TR 33.812 involve a solution where the UICC contains multiple authentication keys $K_i$ such that when a UICC is reprogrammed in order to associate that UICC with a new operator, the new operator that has gained ownership of the UICC is provided by the UICC manufacturer with the next unused authentication key $K_i$ from a list of authentication keys $K_i$ in the UICC.

Aside from these methods, the change in control over and ownership of the UICC could be effected by the original operator providing the authentication key to the new operator. However, the secure storage of the $K_i$ in the AuC of the network operated by the original network operator and in the UICC is fundamental to GSM/3G/4G security. As such, network operators are reluctant to provide other network operators with the $K_i$ associated with subscribers that have been ported out of their network.

One reason for this is that the $K_i$ is highly secret. The $K_i$ is stored and handled with great care and transferring the $K_i$ to another operator implies that it will be transported through the public network in some way.

Another reason is that when the $K_i$ is transferred from one network operator to another network operator, there will then be a copy of the $K_i$ in the network of each operator, i.e. there will be two copies of the $K_i$. This is problematic because the new operator would require a guarantee that the original operator destroys its copy of the $K_i$. However, a guarantee such as this imposes additional security procedures and verification methods.

Another reason is that the original operator and the new operator may have identical values of the $K_i$ for different subscribers because the allocation of the values of $K_i$ for each operator is not coordinated. This may hinder the transfer of the $K_i$ from one operator to another for some values of the $K_i$.

Moreover, in addition to transferring the $K_i$, it is also necessary to transfer a Sequence number (Seq) that is associated with the $K_i$. An authentication process comprises a step whereby the network provides a Seq value to the UE, which the UE passes to the UICC. The UICC can ascertain whether an authentication request has been received from a trusted source by comparing a newly received Seq value with the most recently received Seq value.

SUMMARY

The problems discussed above make it difficult to achieve an effortless and seamless transfer for subscribers between network operators without replacing the UICC. It is the object of the invention to obviate at least some of the above disadvantages and provide an improved system and method of transfer for subscribers between network operators.

The invention enables effortless and seamless transfer for subscribers between network operators (i.e. effortless and seamless subscription porting) without requiring replacement of the Universal Integrated Circuit Card (UICC) and without the need to transfer the authentication key $K_i$ between network operators. The latter is particularly important to preserve the security associated with the $K_i$. The invention streamlines UICC porting for communication devices (for example, for Machine-to-Machine (M2M) communication devices).

According to an aspect of the invention, there is provided a method of operating a node for use by a first network. The first network applies an authentication process in order to allow a subscriber access to a network. Authentication information used in the authentication process is derived using a key associated with a subscriber identity of a subscriber. The key is stored in either a location within the first network or a location external to the first network. The method comprises the step of storing information regarding the locations at which keys associated with subscriber identities are stored. The method further comprises the step of receiving a request for authentication information. The request indicates the subscriber identity to which the request for authentication information relates. Finally, the method comprises the steps of retrieving information regarding the location at which the key associated with said subscriber identity is stored using said subscriber identity and routing the request for authentication information according to the retrieved information regarding the location at which the key is stored.

In this way, the invention allows a subscriber to transfer between operators without requiring replacement of the UICC and without requiring transfer of the authentication key of that UICC towards the operator to which the subscription is ported.

In the event that the location at which the key is stored is a location within the first network, the step of routing the request for authentication information may comprise routing the request for authentication information toward the location within the first network. Alternatively, in the event that the location at which the key is stored is external to the first network, the step of routing the request for authentication information may comprise routing the request for authentication information out of the first network.

The information regarding the location may contain an indication of the network in which the key is stored.

The request for authentication information may be received by the node from an authentication node of the first network or from a second network.

The method may further comprise the steps of receiving authentication information subsequent to the routing of a request for authentication information according to the retrieved information regarding the location at which the key is stored, and routing the authentication information toward the network from which the request for authentication information was received.

The node may be for use in the first network and the method may further comprise the steps of connecting the node to a key storage node that stores keys and connecting the node to an authentication node that issues requests for authentication information for subscribers of the first network.

Alternatively, the node may be external to the first network and the method may further comprise the steps of connecting the node to a key storage node that is external to the first network that stores keys for one or more subscribers of the first network and receiving the request for authentication information from the first network.

According to another aspect of the invention, there is provided a method of operating an intermediate node for use in interconnecting multiple networks. A first one of the networks applies an authentication process in order to allow subscribers of the first network access to a network. Authentication information used in the authentication process is derived using a key associated with a subscriber identity of a subscriber. The method comprises the step of storing information regarding the locations at which keys associated with subscriber identities are stored. For a subscriber identity of a subscriber of the first network, the stored information regarding the location at which the key associated with the subscriber identity is stored comprises the identity of another one of the networks in which the key for the first subscriber is stored. The method further comprises the step of receiving a request for authentication information from the first network. The request indicates the subscriber identity to which the request for authentication information relates. Finally, the method comprises the steps of retrieving the identity of said another one of the networks in which the key is stored using the subscriber identity and routing the request for authentication information to said another one of the networks.

The method may further comprise the steps of: receiving authentication information subsequent to the routing of a request toward said other network and routing the authentication information toward the first network.

According to another aspect of the invention, there is provided a node for use by a first network. The first network applies an authentication process in order to allow a subscriber access to a network. Authentication information used in the authentication process is derived using a key associated with a subscriber identity of a subscriber. The key is stored in either a location within the first network or a location external to the first network. The node comprises a database configured to store information regarding the locations at which keys associated with subscriber identities are stored. The node further comprises a communications interface configured to receive a request for authentication information. The request indicates the subscriber identity to which the request for authentication information relates. Finally, the node comprises a processing unit configured to use said subscriber identity to retrieve information regarding the location at which the key associated with said subscriber identity is stored from the database and to route the request via the communications interface according to the retrieved information regarding the location at which the key is stored.

The database may be further configured to store the identity of a subscriber of a second network and the location within the first network at which the key is stored in the event that the key for the subscriber of the second network is stored in a location within the first network and the communications interface may be further configured to receive a request for authentication information from the second network.

The communications interface may be further configured to receive authentication information subsequent to the routing of a request for authentication information according to the retrieved information regarding the location at which the key is stored, and the processing unit may be further configured to route the authentication information via the communications interface toward the network from which the request for authentication information was received.

In the event that the key is stored in a location external to the first network, the information regarding the location stored in the database may contain an indication that the key is stored externally to the first network. Alternatively, in the event that the key is stored in a location external to the first network, the information regarding the location stored in the database may contain an indication of the network in which the key is stored.

The node may be for use in the first network and may be configured to connect to a key storage node that is configured to store keys and an authentication node that issues requests for authentication information for subscribers of the first network. The key storage node may be an Authentication Centre, AuC, and the authentication node may be one or both of a Home Location Register, HLR, and a Home Subscriber Server, HSS.

Alternatively, the node may be external to the first network and may be configured to connect to a key storage node that is external to the first network, that stores keys for one or more subscribers of the first network and the communications interface may be further configured to receive the request for authentication information from the first network.

According to another aspect of the invention, there is provided an intermediate node for use in interconnecting multiple networks. A first one of the networks applies an authentication process in order to allow subscribers of the first network access to a network. Authentication information used in the authentication process is derived using a key associated with a subscriber identity of a subscriber. The intermediate node comprises a database configured to store information regarding the locations at which keys associated with subscriber identities are stored. For a subscriber identity of a subscriber of the first network, the stored information regarding the location at which the key associated with the subscriber identity is stored comprises the identity of another one of the networks in which the key for the first subscriber is stored. The intermediate node further comprises a communications interface configured to receive a request for authentication information from the first network. The request indicates the subscriber identity to which the request for authentication information relates. Finally, the intermediate node comprises a processing unit configured to use the subscriber identity to retrieve the identity of said another one of the networks in which the key is stored from the database and to route the request via the communications interface to said another one of the networks.

The communications interface may further be configured to receive authentication information subsequent to the routing of a request to said another one of the networks, and the processing unit may be configured to route the authentication information via the communications interface to the first network.

BRIEF DESCRIPTION OF THE DRAWINGS

For a better understanding of the present invention, and to show how it may be put into effect, reference will now be made, by way of example, to the accompanying drawings, in which:

FIG. 6 is a record table illustrating an example database in the node in accordance with an embodiment of the invention;

DETAILED DESCRIPTION

Figure 1:
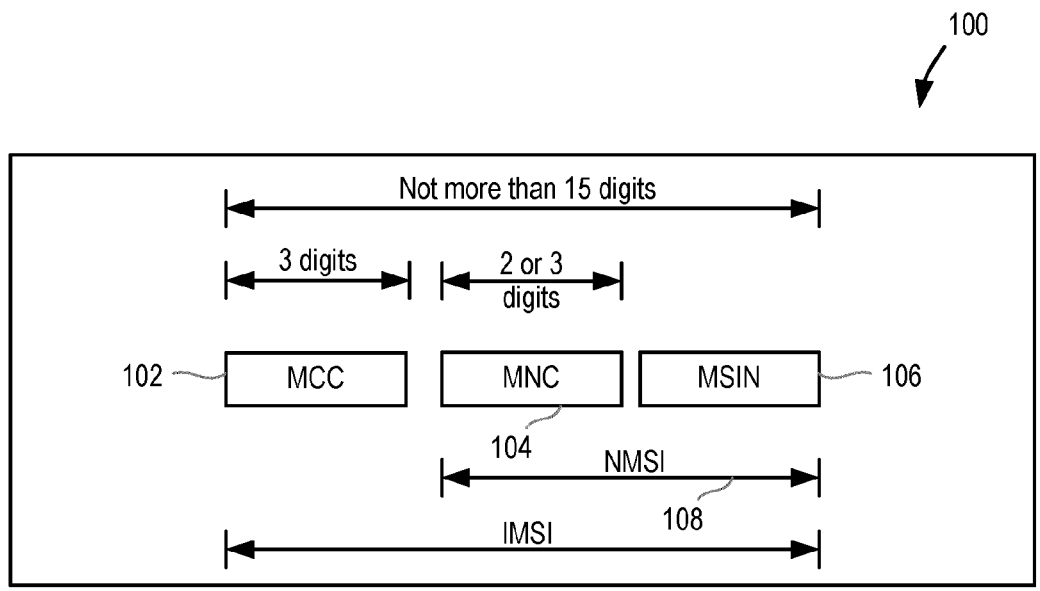
FIG. 1 is a block diagram illustrating the structure of an International Mobile Subscriber Identity (IMSI)

The structure of an International Mobile Subscriber Identity (IMSI) 100 is illustrated in FIG. 1. The IMSI comprises a Mobile Country Code (MCC) 102, a Mobile Network Code (MNC) 104, and a Mobile Subscription Identification Number (MSIN) 106. Typically, the MCC consists of a three digit number, the MNC consists of a two or three digit number, and the MCC, MNC, and MSIN together consist of no more than fifteen digits. The combination of the MNC and MSIN of the IMSI make up the National Mobile Station Identity (NMSI) 108. The IMSI is programmed into a Universal Subscriber Identity Module (USIM) in a Universal Integrated Circuit Card (UICC) at card production. This means that the UICC is, directly after production, tightly associated with a particular network operator.

Figure 2:
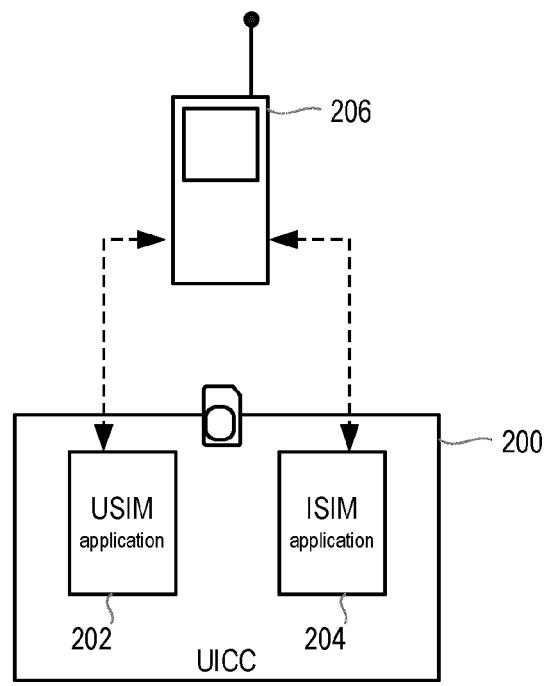
FIG. 2 is a block diagram illustrating an example Universal Integrated Circuit Card (UICC) and a User Equipment (UE)

An example structure of a UICC 200 is illustrated in FIG. 2. The UICC 200 comprises a Universal Subscriber Identity Module (USIM) application 202 and an IP Multimedia Services Identity Module (ISIM) application 204. The UICC 200 is inserted into a user equipment (UE) device 206 and applications within that UE device access the USIM and ISIM applications of the UICC 200. Each of the USIM application 202 and ISIM application 204 contain a respective authentication key $K_i$.

In accordance with the invention, as with existing methods, a UICC is manufactured with a particular $K_i$, which it is not possible to modify. In some embodiments, the key $K_i$ is provided to the operator that purchases the UICC, i.e. the operator that becomes the first owner of the UICC. That operator then has the ability to authenticate the user of the UICC. Throughout the lifetime of the UICC, authentication of that UICC is based on that $K_i$. In other embodiments, the key $K_i$ is held in a key storage facility external to the network of the operator that first purchases the UICC.

As is known, the network applies an authentication process in order to allow a subscriber access to a network. The subscriber may require access to the network that is to apply the authentication process or may require access to another network (for example, if the subscriber is roaming). The authentication process applied by the network makes use of authentication information (which may, for example, be in the form of a set of authentication triplets or quintuplets) that is derived using the authentication key associated with the subscriber identity of the subscriber. It should be noted that the term "network" is used generally and could refer to the "first network" and/or the "second network" that will be described later.

In accordance with the invention, when a subscription is ported from one network to another, the authentication key associated with the subscriber identity of the subscriber stays in the location at which it was originally stored, and subsequent authentication requests made by the subscriber to the new network operator are routed by a node in the new network of the new network operator to the location at which the authentication key is stored (for example, the AuC in the original network or in an AuC shared by multiple networks that is external to both the original and new networks).

Figure 3:
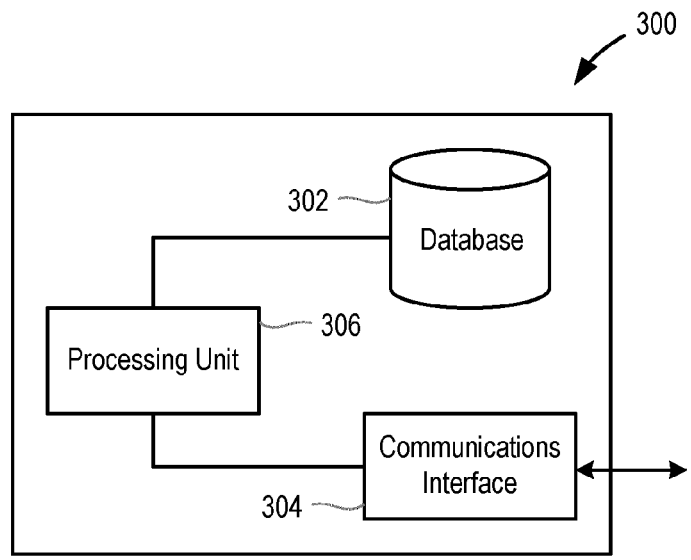
FIG. 3 is a block diagram illustrating a node for use by a network in accordance with the invention.

FIG. 3 illustrates a node 300 for use by a network in accordance with the invention. In preferred embodiments, the node is a Diameter Signalling Controller (DSC). The node 300 comprises a database 302 and a communications interface 304, which are connected to a processing unit 306 of the node 300. The network may be a cellular mobile communications network.

Figure 4:
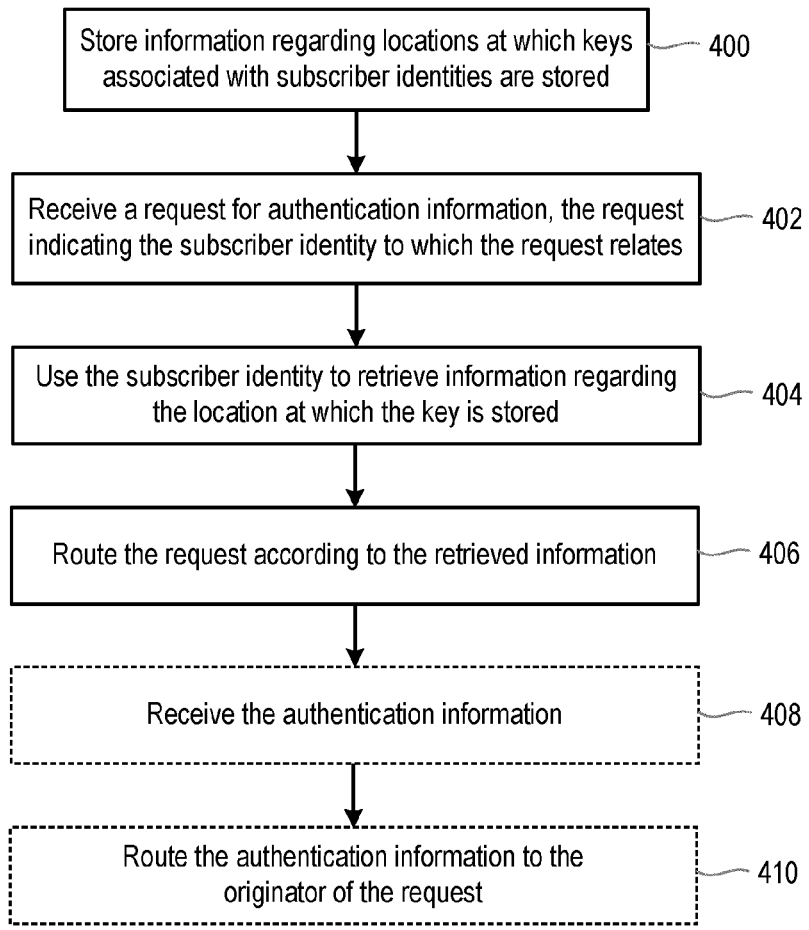
FIG. 4 is a flow chart illustrating a method for operating a node for use by a network in accordance with an aspect of the invention.

A method for operating a node for use by a network in accordance with an aspect of the invention is illustrated in FIG. 4.

With reference to FIG. 4, the database 302 of the node 300 stores information regarding the locations at which keys associated with subscriber identities are stored (step 400). The communications interface 304 of the node 300 receives a request for authentication information (step 402). The request for authentication information indicates the subscriber identity (i.e. contains an identification of the subscriber) to which the request for authentication information relates. The processing unit 306 of the node 300 uses the subscriber identity to retrieve information regarding the location at which the key associated with the subscriber identity is stored from the database (step 404). The processing unit 306 then routes the request via the communications interface 304 according to the retrieved information regarding the location at which the key is stored (step 406). The communications interface (304) is also configured to receive authentication information (step 408) and the processing unit (306) is configured to route the authentication information via the communications interface (304) to the originator of the request (step 410).

Example network architecture in accordance with an embodiment of the invention in which the method is applied will now be described with reference to FIG. 5.

Figure 5:
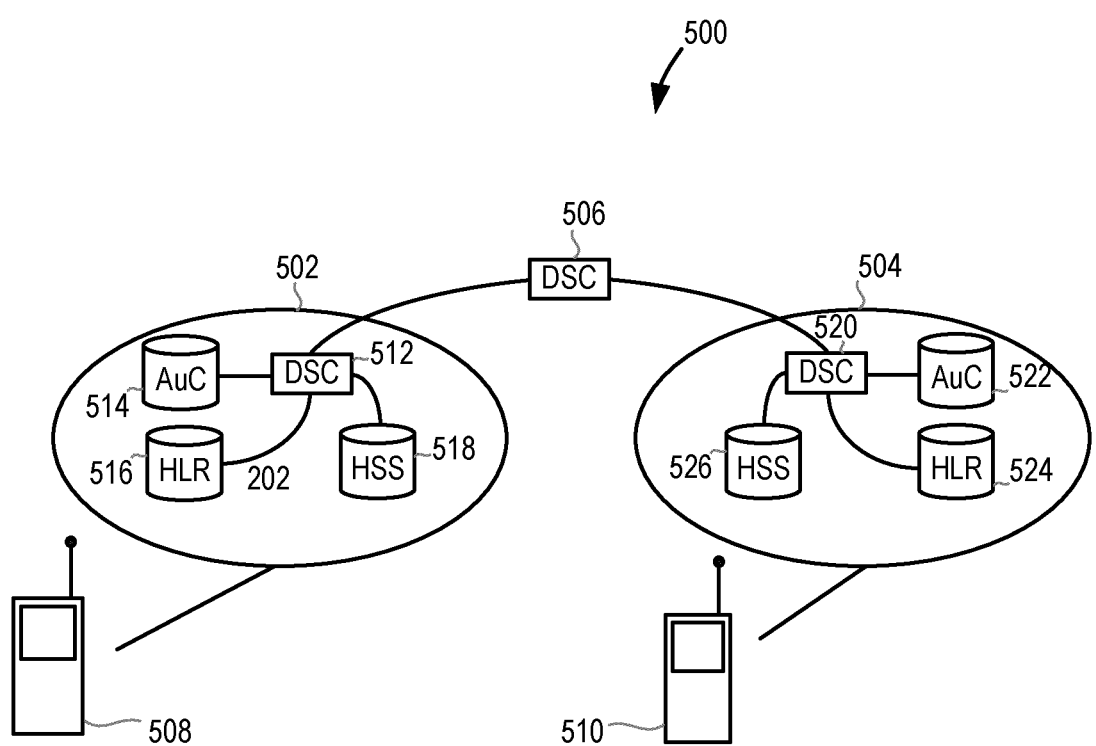
FIG. 5 is a block diagram illustrating network architecture in accordance with an embodiment of the invention.

The network architecture 500 of FIG. 5 comprises a first network 502 operated by a first operator and a second network 504 operated by a second operator, in communication with each other via an external node such as a Diameter Signalling Controller (DSC) 506 in a Diameter Signalling network. In some embodiments the DSC 506 is generally conventional, but in other embodiments the DSC 506 corresponds to an intermediate node as described in more detail below. The first network 502 and second network 504 may be a CS, PS, EPS and/or IMS network.

A first subscriber 508 is a subscriber of the first network 502 and a second subscriber 510 is a subscriber of the second network 504. The IMSI contained in the USIM in the UICC of the first subscriber 508 contains an indication that the first subscriber 508 is associated with (i.e. a subscriber of) the first network 502. Similarly, the IMSI contained in the USIM in the UICC of the second subscriber 510 contains an indication that the second subscriber 510 is associated with (i.e. a subscriber of) the second network 504.

The external DSC 506 communicates with the first network 502 via a DSC 512 in the first network 502. The DSC 512 in the first network 502 has the configuration of the node 300 shown in FIG. 3. The DSC 512 in the first network 502 communicates via its communications interface 304 with a key storage node of the first network 502, which may be an Authentication Centre AuC 514 of the first network 502. The DSC 512 in the first network 502 contains a database 302 that stores information regarding the locations at which keys associated with subscriber identities are stored. The DSC 512 in the first network 502 also communicates via its communications interface 304 with an authentication node of the first network 502, which may be one or both of a Home Location Register (HLR) 516 and a Home Subscriber Server (HSS) 518 of the first network 502. The HLR 516 and HSS 518 issue authentication requests when a subscriber of the first network 502 requests or requires access to a service (for example, CS, PS, EPS or IMS services).

Similarly, the external DSC 506 communicates with the second network 504 via a DSC 520 in the second network 504. The DSC 520 in the second network 504 also has the configuration of the node 300 shown in FIG. 3. The DSC 520 in the second network 504 communicates via its communications interface 304 with a key storage node of the second network, which may be an Authentication Centre AuC 522 of the second network 504. The DSC 520 in the second network 504 contains a database 302 that stores information regarding the locations at which keys associated with subscriber identities are stored. The DSC 520 in the second network 504 also communicates via its communications interface 304 with an authentication node of the second network 504, which may be one or both of a Home Location Register (HLR) 524 and a Home Subscriber Server (HSS) 526 of the second network 504.

In existing network architecture, the HSS or HLR of a network is configured to apply an authentication process. Generally, this involves the HSS or HLR accessing another node in that network (typically the AuC of the network) to request authentication information to use in the authentication process. According to the network architecture in accordance with the invention, the request for authentication information from the HSS or HLR is sent via a DSC in the network, as opposed to being sent directly from the HSS or HLR to the AuC. Thus, the DSC has the capability to receive, process and forward authentication messages, the DSC has access to an authentication key database 302, the DSC has the capability in its processing unit 306 to determine from this database 302 whether the authentication key (relating to an authentication request) is stored at a location within the network or at a location external to the network, and the DSC is capable of forwarding the authentication request message via its communications interface 304 internally to the AuC of the network or to an external DSC according to the location information held in the database 302.

An example database 302 in accordance with an embodiment of the invention is shown in FIG. 6. The database 302 contains a mapping between subscriber identity and "authentication authority" (i.e. where the key is stored). In respect of CS, PS or EPS network authentication, the subscriber identity is typically the IMSI of the USIM in the UICC. In respect of IMS authentication, the subscriber identity is typically the IP Multimedia Services (IMS) Private Identity (IMPI). The "authentication authority" column indicates the identity of the operator or network that first owned the UICC and that holds the authentication key associated with the subscriber identity (i.e. associated with the IMSI or IMPI). The database 302 also contains a column indicating "UICC porting status" that is associated with the authentication key. The first set of three entries in the database use the IMSI of the relevant subscriber and are used for CS, PS or EPS authentication as appropriate, and second set of three entries are used for IMS.

Where a UICC initially owned by the first network 502 is still owned by the first network 502 (i.e. where the UICC has not been ported out to another network such as the second network 504), the UICC porting status is shown in the database in the DSC 512 in the first network 502 as "UICC not ported". In this case, since the first network 502 owns the authentication key, the database in the DSC 512 in the first network 502 points to the AuC 514 of the first network 502 for retrieval of the authentication information (entry 600 of FIG. 6).

Where a UICC initially owned by the first network 502 is no longer owned by the first network 502 (i.e. where the UICC has been ported out to another network such as the second network 504), the UICC porting status is shown in the database in the DSC 512 in the first network 502 as "UICC ported-out"'. Since the first network 502 still owns the authentication key for the UICC, the database in the DSC 512 in the first network 502 contains an entry for the new IMSI/IMPI for the second network 504 to which the UICC has been ported and an indication that points to the AuC 514 of the first network 502 for retrieval of the authentication information (entry 602 of FIG. 6). The new network operator to which the UICC has been ported assigns the new IMSI/IMPI to the UICC. The new IMSI/IMPI may contain an indication of the new network operator. For example, the IMSI/IMPI in entry 602 contains the network code of the second network 504 (namely, the network code "655 02"), which indicates that the new IMSI/IMPI was assigned to the UICC by the operator of the second network 504.

Where a UICC initially owned by another network such as the second network 504 is transferred to the first network 502 (i.e. where the UICC has been ported in to the first network 502 from the second network 504), the UICC porting status is shown in the database as "UICC ported in". In this case, the second network 504 initially owned the UICC and thus the second network 504 still owns and stores the authentication key for the UICC even though the UICC has been ported to the first network 502 (i.e. even though the first network 502 is the new owner of the UICC). As such, the database 512 of the first network 502 contains an entry for the new IMSI/IMP of the UICC that indicates "other network" for retrieval of the authentication information (entry 604 of FIG. 6). In this embodiment, the entry "other network" indicates the network in which the authentication key for the UICC is stored.

As noted above, the second set of these entries 606 in the database shown in FIG. 6 reflect a specific use case whereby authentication is applied for IMS registration. In this use case, the IMPI for the IMS registration may be derived from the IMSI stored in the USIM. The same authentication process applies for IMS registration as for CS, PS or EPS network authentication. In other words, a UICC may be reprogrammed with an IMSI of another operator. IMS registration can be based on the IMSI such that authentication is then based in the IMSI-derived IMPI. However, the authentication key to be used for this authentication will still be owned by the operator that originally owned that UICC.

IMS authentication may be based on an IMPI obtained from the ISIM. ISIM based IMPI may have the same structure as a USIM based IMPI (as shown by the "IMSI/IMPI" values in entries 600, 602, 604 of the database shown in FIG. 6). Alternatively, the IMPI may have a different structure (for example, user@IMS-service-provider.com). An ISIM may have its own authentication key or may share an authentication key with the USIM. The principle of cross-operator usage of authentication keys is equally applicable for authentication related to IMS registration when the IMS registration is based on IMPI from an ISIM with the ISIM having its own authentication key and the IMPI not conforming to the USIM-derived IMPI format.

Referring back to FIG. 5, the DSC 512 in the first network 502 is configured to receive requests for authentication information via its communications interface 304. A request for authentication information indicates the subscriber identity to which the request for authentication information relates. A request for authentication information may be received from the authentication node (i.e. from the HLR 524 or the HSS 526) of the first network 502, from the second network 504 operated by the second network operator or from another network (not shown).

Figure 7:
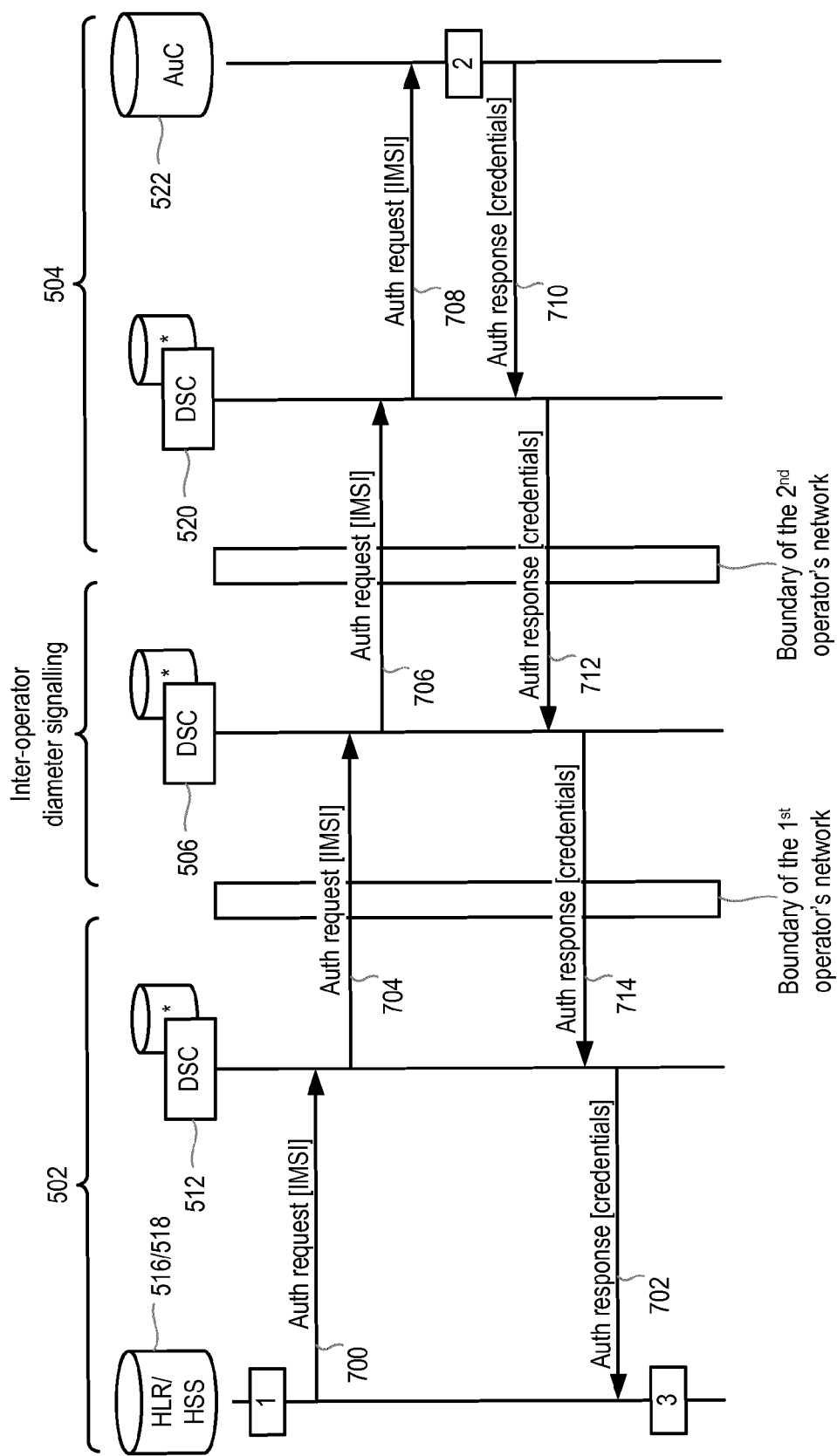
FIG. 7 is a signalling diagram, illustrating the signalling by the Home Subscriber Server (HSS) and Diameter Signalling Controller (DSC) of a first network in the case where a "ported-in" subscriber of the first network requests access to the services of the first network.

FIG. 7 illustrates the signalling between the HSS 518 and DSC 512, as well as the signalling between the first and second network in the case where a "ported-in" subscriber of the first network requests access to the services of the first network.

With reference to FIGS. 5, 6 and 7, the HLR 516 or the HSS 518 of the first network 502 receives a request for access or a service from a subscriber. The subscriber is assumed to be physically located in the first network 502, but the same principles apply if the subscriber is roaming. The request may be received from the subscriber via a Mobility Management Entity (MME) in the first network 502. The request for access received by the HLR 516 or the HSS 518 of the first network 502 from the subscriber triggers the HLR 516 or the HSS 518 to apply an authentication process in order to allow the subscriber access to the services of the first network 502.

The HLR 516 or the HSS 518 of the first network 502 is configured to pass a request for authentication information to the DSC 512 in the first network 502 since the HLR 516 and the HSS 518 of the first network 502 do not have knowledge of the location at which the authentication key for the subscriber is stored. The DSC 512 in the first network 502 thus receives via its communications interface 304 a request for authentication information (signal 700), which indicates the subscriber identity to which the request relates, from the HLR 516 or the HSS 518 of the first network 502. The request for authentication information may be a Mobile Application Part (MAP) message or may be a Diameter message.

The DSC 512 in the first network 502 contains a database 302 such as that shown in FIG. 6 and the processing unit 306 of the DSC 512 in the first network 502 uses the subscriber identity to which the request relates to retrieve information regarding the location at which the key associated with the subscriber identity is stored from the database 302.

If the subscriber is a "not-ported" subscriber, the processing unit 306 of the DSC 512 in the first network 502 will determine from the database 302 that the key is stored in the AuC 514 of the first network 502 (for example, corresponding to the first entry 600 in FIG. 6), and the processing unit 306 of the DSC 512 in the first network 502 will route the request for authentication information via the communications interface 304 to the AuC 514 of the first network 502 (it will be noted that the AuC 514 is not shown in FIG. 7).

Subsequent to the routing of the request for authentication information from the DSC 512 in the first network 502 to the AuC 514 of the first network 502, the DSC 512 in the first network 502 receives via its communications interface 304 the authentication information from the AuC 514 of the first network 502 and the processing unit 306 of the DSC 512 in the first network 502 routes the authentication information via the communications interface 304 to the HLR 516 or the HSS 518 of the first network 502 from which the request for authentication information was received (signal 702).

The HLR 516 or the HSS 518 of the first network 502 then performs the required authentication process using the authentication information received from the DSC 512 in the first network 502 to decide whether to allow the subscriber having the subscriber identity to which the request related access to the first network 502. It will be appreciated that apart from the operation of the DSC 512, the authentication process performed by the HLR 516 or HSS 518 and AuC 514 is generally conventional.

If, however, the subscriber is a "ported-in" subscriber from the second network 504, the processing unit 306 of the DSC 512 in the first network 502 will determine from the database 302 that the key is stored in the second network 504, so the processing unit 306 of the DSC 512 in the first network 502 will route the request for authentication information via the communications interface 304 out of the first network 502 (signal 704), via an inter-operator diameter signalling network (comprising DSC 506) to the second network 504 (signal 706).

For example, this would occur where the subscriber required access to the first network 502 and the second network 504 was the original network for the subscriber such that the second network 504 retains ownership of the authentication key for the UICC of the subscriber of the first network 502. With reference to entry 604 in FIG. 6, the database 302 in the DSC 512 in the first network 502 indicates that the key associated with the subscriber identity of the subscriber is stored in the second network 504.

The DSC 520 in the second network 404 receives via its communications interface 304 the request for authentication information (signal 706). The DSC 520 in the second network 504 contains a corresponding database 302 to that shown in FIG. 6 from which the processing unit 306 of the DSC 520 in the second network 404 can determine the location at which the key is stored for the first subscriber. From the point of view of the second network 504, the first subscriber 508 (or rather the UICC used by that subscriber 508) is a "ported-out" subscriber and the database in the DSC 520 in the second network 504 will contain an entry for the first subscriber 508 similar to entry 602 in FIG. 6. Thus, the indication will be the address of the AuC 522 of the second network 504 (or the address of one specific AuC in the case where multiple AuCs are installed).

The DSC 520 in the second network 504 communicates the request via its communications interface 304 to the AuC 522 of the second network 504 (signal 708). The AuC 522 of the second network 504 does not have to check whether the request for authentication information originated from the network owning the subscriber identity to which the request related since this check may have already been performed by a DSC.

The DSC 520 in the second network 504 then receives via the communications interface 304 the authentication information (such as authentication vectors (triplets/quintuplets)) from the AuC 522 of the second network 504 (signal 710) and the processing unit 306 of the DSC 520 in the second network 504 routes the authentication information via the communications interface 304 toward the first network 502 from which the request for authentication information was received (signal 712) via DSC 506 (signal 714).

The DSC 520 in the second network 504 may route the authentication information directly to the first network 502 or via one or more intermediate DSCs 506.

The DSC 512 in the first network 502 receives via its communications interface 304 the authentication information from the DSC 520 in the second network 504 and the processing unit 306 of the DSC 512 in the first network 502 routes the authentication information to the HLR 516 or the HSS 518 of the first network 502 (signal 702).

The HLR 516 or the HSS 518 of the first network 502 then performs the required authentication process using the authentication information received from the DSC 512 in the first network 502 to allow the subscriber having the subscriber identity to which the request related access to the first network 502. As above, the operation of the HLR 516 or HSS 518 in completing the authentication process is generally conventional.

In this way, a former subscriber of the second network 504 can become a subscriber of the first network 502 and thus gain access to the services of the first network 502 without the need to replace the UICC used by that subscriber. Moreover, the authentication key $K_i$ of the UICC used by the subscriber can remain in the AuC 522 of the second network 504, which is the network that originally owned the authentication key of that UICC, to maintain the high level of security associated with that authentication key $K_i$.

It will be understood that when a subscriber is "ported-in" to the second network 504 from the first network 502, the DSC 520 in the second network 504 performs a similar function to the DSC 512 in the first network 502 shown in FIG. 7 when the "ported-in" subscriber requests access to the services of the second network 504, and the DSC 512 in the first network 502 performs a similar function to the DSC 520 in the second network 504 shown in FIG. 7 when it receives a request for authentication information from the DSC 520 in the second network 504.

According to another embodiment of the invention, with reference to FIGS. 5, 7, 8, 9 and 10, the database 302 in the DSC of a network may not store the specific location at which the associated key is stored, but may instead simply indicate that the key is stored externally to the network. In this case, the DSC will then simply route the request for authentication information out of the network (signal 704).

Figure 8:
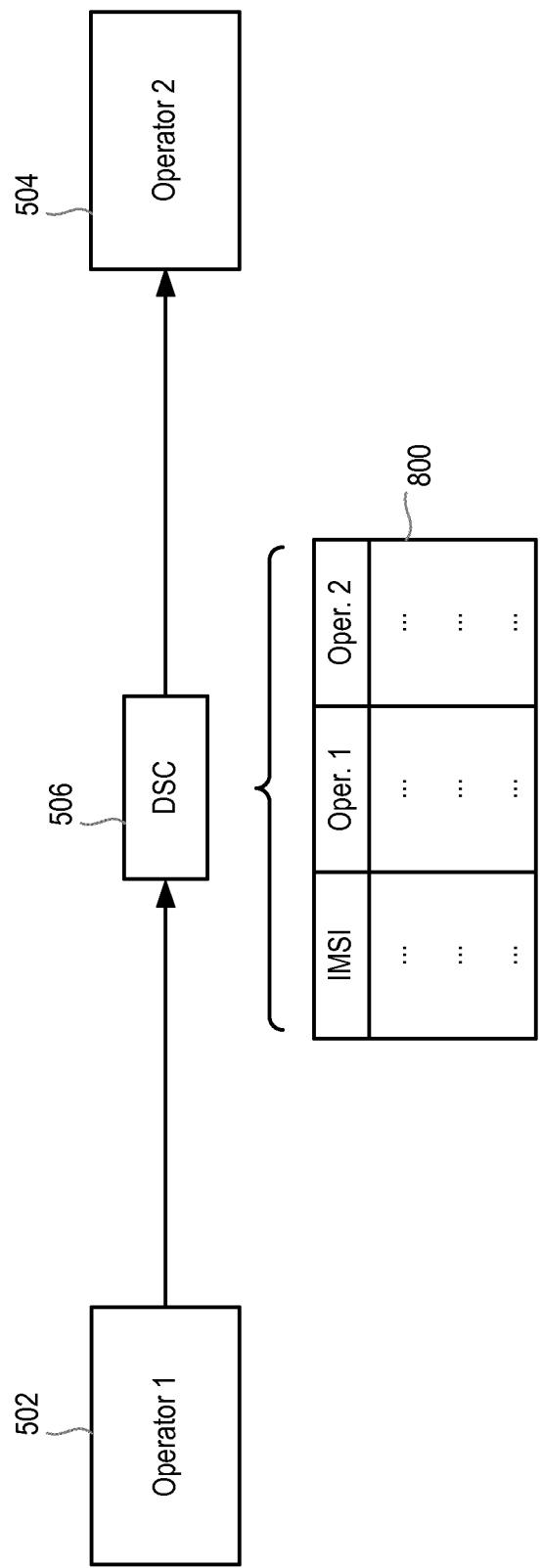
FIG. 8 is a block diagram illustrating an example process performed by an intermediate node for use in interconnecting multiple networks in accordance with another aspect of the invention.

For example, with reference to FIG. 8, where the request relates to a "ported-in" subscriber the DSC 512 in the first network 502 routes the request for authentication information via its communications interface 304 out of the first network 502 towards an inter-operator diameter signalling network and DSC 506. The DSC 506 in the diameter signalling network has the configuration of the node 300 shown in FIG. 3. In this embodiment, the inter operator diameter signalling network contains one or more DSCs 506 that have the capability to determine the network that owns the authentication key for the subscriber identity to which the request relates. In particular, one or more of the DSCs 506 in the diameter signalling network contain a database 302, 800. This database is shown in more detail in FIG. 9. In this embodiment, this or these DSCs 506 are referred to as "intermediate" nodes.

In particular, the database 302, 800 comprises entries that indicate the "donor" operator (i.e. the original owner of the key or subscriber, and the network in which the key is stored), the "recipient" operator (i.e. the current owner of the subscriber) and the subscriber identity (for example, IMSI) for the subscriber in the recipient network.

A method for operating an intermediate node (such as a DSC 506 in a diameter signalling network) for use in interconnecting multiple networks in accordance with this aspect of the invention will now be described with reference to FIG. 10.

The DSC 506 in the diameter signalling network stores in its database 302, 800 information regarding the locations at which keys associated with subscriber identities are stored (step 1000).

When the DSC 506 in the diameter signalling network receives a request for authentication information via its communications interface 304 from a DSC of a (for example, first) network, the processing unit 306 of the DSC 506 in the diameter signalling network checks the database 302, 800 for the subscriber identity (for example, the IMSI or IMPI) to which the request for authentication relates (step 1002). The subscriber identity is the identity allocated to the subscriber by the first network 502 following the transfer of the subscriber to the first network 502. The subscriber identity generally contains some indication of the network to which the subscriber is currently associated.

The processing unit 306 of the DSC 506 in the diameter signalling network determines from, for example, entry 902 in the database 800 that the subscriber identity to which the request for authentication relates is currently owned by the first network 502 (the "recipient operator") and that the subscriber having the subscriber identity to which the request for authentication relates was originally a subscriber of the second network 504 (the "donor operator"). Since the subscriber was originally a subscriber of the second network 504, the authentication key for that subscriber is stored in the second network 504 because the authentication key remains in its original location. The processing unit 306 of the DSC 506 in the diameter signalling network thus uses the subscriber identity to retrieve the identity of the second network 504 as the location in which the authentication key is stored from the database 800 (step 1004). The processing unit 306 of the DSC 506 in the diameter signalling network then routes the request for authentication information via the communications interface 304 to the second network 504 (step 1006, signal 706).

The DSC 520 in the second network 504 contains a corresponding database 302 to that stored in the DSC 512 in the first network 502 (i.e. it does not store the specific locations of keys for "ported-in" subscribers, but indicates the AuC 522 of the second network 504 for "not-ported" and "ported-out" subscribers) from which the processing unit 306 of the DSC 520 in the second network 504 can determine the location at which the key is stored. Thus, from the point of view of the second network 504, the subscriber is a "ported-out" subscriber and the database 302 in the DSC 520 in the second network 504 will contain an entry for the subscriber 508 similar to entry 602 in FIG. 6. Thus, the indication will be the address of the AuC 522 of the second network 504 (or the address of one specific AuC in the case where multiple AuCs are installed).

The DSC 520 in the second network 504 communicates the request via its communications interface 304 to the AuC 522 of the second network 504 (signal 708) and the DSC 520 in the second network 504 then receives the authentication information (for example, triplet or quintuplet) via its communications interface 304 from the AuC 522 of the second network 504 (signal 710). The processing unit 306 of the DSC 520 in the second network 504 then routes the authentication information via the communications interface 304 toward the DSC 506 in the diameter signalling network from which the request for authentication information was received (signal 712).

The DSC 506 in the diameter signalling network receives the authentication information via its communications interface 304 from the DSC 520 in the second network 504 and the processing unit 306 of the DSC 520 in the second network 504 routes the authentication information via the communications interface 304 to the DSC 512 in the first network 502 from which it received the request for authentication information (signal 714). The DSC 512 in the first network 502 receives the authentication information via its communications interface 304 from the DSC 506 in the diameter signalling network and the processing unit 306 of the DSC 512 in the first network 502 routes the authentication information via the communications interface 304 to the HLR 516 or the HSS 518 of the first network 502 (signal 702) as appropriate.

The HLR 516 or the HSS 518 of the first network 502 then performs the required authentication process using the authentication information received from the DSC 512 in the first network 502 to allow the subscriber having the subscriber identity to which the request related access to the first network 502. As above, the operation of the HLR 516 or HSS 518 in completing the authentication process is generally conventional.

It will be understood that when a "ported-in" subscriber from the first network 502 requests access to the services of the second network 504 the DSC 520 in the second network 504 performs a similar function to the DSC 512 in the first network 502 and the DSC 512 in the first network 502 performs a similar function to the DSC 520 in the second network 504 when it receives a request for authentication information from the DSC 520 in the second network 504. The DSC 506 in the diameter signalling network operates in the same way in this case (for example, using entry 900 in the database 800).

Example network architecture in accordance with another embodiment of the invention will now be described with reference to FIG. 11.

In this embodiment, rather than store keys in the AuCs in the networks belonging to the network operators, a shared key storage facility (referred to herein as an "independent authentication authority") is provided that is external the operator's networks. The independent authentication authority stores keys on behalf of the networks and provides authentication information to networks as required. This embodiment has the advantage that it may not be necessary for networks 502, 504 to have to manage and store keys for UICCs that are no longer subscribers to their networks. Briefly, in this embodiment, DSCs 512, 520 are provided as described above that use their database 302 to route authentication requests to the independent authentication authority (or in some cases to an intermediate node 506 as described above) that comprises a database that maps the "recipient" network to the independent authentication authority (i.e. the "donor" operator). As before, the DSCs 512, 520, in the first and second networks 502, 504 have the configuration illustrated in FIG. 3.

Figure 11:
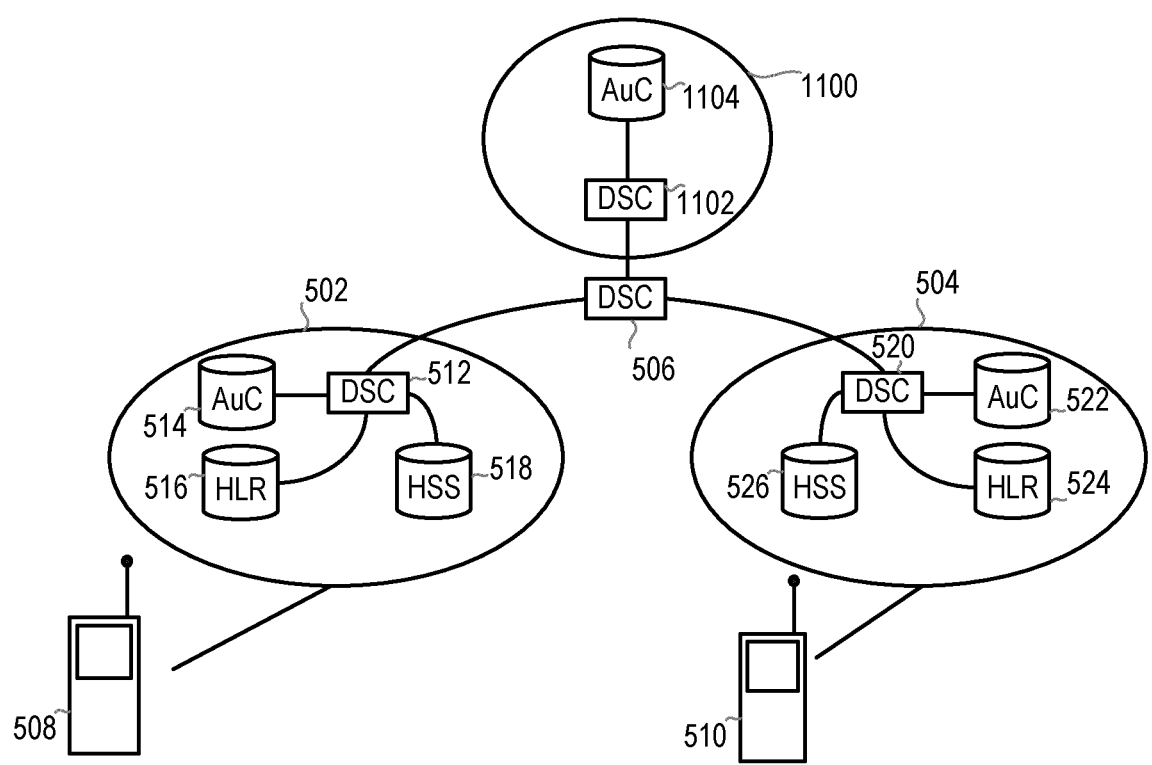
FIG. 11 is a block diagram illustrating network architecture including an independent authentication authority in accordance with another embodiment of the invention.

The network architecture of FIG. 11 is similar to that shown in FIG. 5 with the addition of the independent authentication authority 1100 connected to the DSC 506 in the diameter signalling network. So that the independent authentication authority 1100 is connected to the first network 502 and the second network 504. The independent authentication authority 1100 is an entity that is the "first owner" of authentication keys and provides authentication as a service.

The independent authentication authority 1100 comprises a DSC 1102 and an AuC 1104. The DSC 1102 and AuC 1104 form a network operated by the independent authentication authority 1100. The DSC 1102 in the independent authentication authority 1100 has the configuration illustrated in FIG. 3 and contains a database 302 of the form shown in FIG. 6. The database 302 contains a mapping between subscriber identity and authentication authority, which in this case is the AuC 1104 of the independent authentication authority 1100.

As in conventional network architectures, the authentication keys owned and stored by the independent authentication authority 1100 are secure in that it is not possible to read, modify or move the authentication keys in the AuC 1104 in the independent authentication authority 1100. When a UICC owned by the independent authentication authority 1100 is subsequently assigned to a network, the independent authentication authority 1100 remains the owner of the authentication key associated with that UICC and the AuC 1104 in the independent authentication authority 1100 continues to store that authentication key (i.e. the authentication key is not transferred to the network operator). This is in contrast to the subscriber identity (for example the IMSI or IMPI) associated with the UICC, which is reprogrammed to assign the UICC to the network to which the UICC is subsequently assigned.

The DSC 1102 in the independent authentication authority 1100 is configured to operate in a similar way to DSCs 512, 520 described above and is thus configured to receive requests for authentication information via its communications interface 304 from the first network 502 and the second network 504. The DSC 512 in the first network 502 and the DSC 520 in the second network 504 each contain a database 302 of the form shown in FIG. 6. In addition to the UICCs "ported-in" from the independent authentication authority 1100, the database 302 may include entries for UICCs that were initially (and still are) owned by the respective network.

Where a subscriber using a UICC that was passed by the independent authentication authority to the first network 502 requests access to the services of the first network 502, the HLR 516 or the HSS 518 of the first network 502 receives the request for access and passes a request for authentication information, which indicates the subscriber identity to which the request relates, to the DSC 512 in the first network 502

Figures 9, 10:
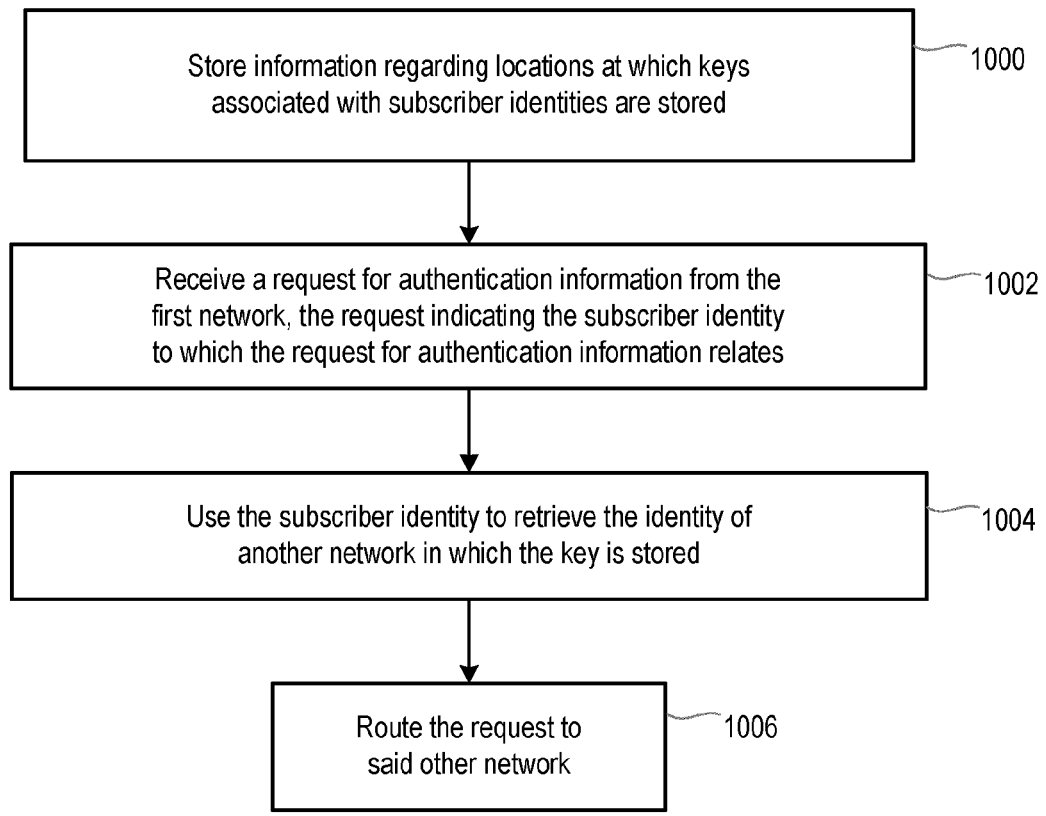
FIG. 9 is a record table illustrating an example database in the intermediate node.
FIG. 10 is a flow chart illustrating a method for operating an intermediate node for use in interconnecting multiple networks in accordance with the other aspect of the invention.

The DSC 512 in the first network 502 receives via its communications interface 304 the request for authentication information from the HLR 516 or the HSS 518 of the first network 502 and the processing unit 306 of the DSC 512 in the first network 502 uses the subscriber identity of the subscriber to determine from the database 302 that the subscriber is a "ported-in" subscriber and that the authentication key associated with the subscriber identity of the subscriber is stored either in the "independent authentication authority" or, in the alternative embodiments where DSC 506 is an intermediate node and comprises a database 302 as shown in FIG. 9, that the authentication key is stored externally to the first network 502.

The processing unit 306 of the DSC 512 in the first network 502 will thus route the request for authentication information via the communications interface 304 to the independent authentication authority 1100 via the inter-operator diameter signalling network and DSC 506.

The DSC 1102 in the independent authentication authority 1100 will receive the request for authentication information via its communications interface 304 (and via DSC 506) and the processing unit 306 of the DSC 1102 in the independent authentication authority 1100 will determine from its database 302 that the authentication key associated with the subscriber identity to which the request relates is stored in the AuC 1104 of the independent authentication authority 1100.

The DSC 1102 in the independent authentication authority 1100 will thus communicate the request via its communications interface 304 to the AuC 1104 of the independent authentication authority 1100 and will then receive the authentication information via its communications interface 304 from the AuC 1104 of the independent authentication authority 1100. The processing unit 306 of the DSC 1102 in the independent authentication authority 1100 will route the authentication information via its communications interface 304 back to the first network 502 from which the request for authentication information was received.

The DSC 512 in the first network 502 receives the authentication information via its communications interface 304 from the DSC 1102 in the independent authentication authority 1100 and the processing unit 306 of the DSC 512 in the first network 502 routes the authentication information via the communications interface 304 to the HLR 516 or the HSS 518 of the first network 502.

The HLR 516 or the HSS 518 of the first network 502 then performs the required authentication process using the authentication information received from the DSC 512 in the first network 502 to allow the subscriber having the subscriber identity to which the request related access to the first network 502. As above, the operation of the HLR 516 or HSS 518 in completing the authentication process is generally conventional.

It will be understood that the DSC 1102 in the independent authentication authority 1100 performs in a similar way in the case where it receives a request for authentication information from the DSC 520 in the second network 504 and that, in this case, the DSC 520 in the second network 504 performs a similar function to that described for the DSC 512 in the first network 502.

The independent authentication authority 1100 may comprise one or more DSCs and one or more AuCs. An example architecture of an independent authentication authority in accordance with the invention is shown in FIG. 12.

Figure 12:
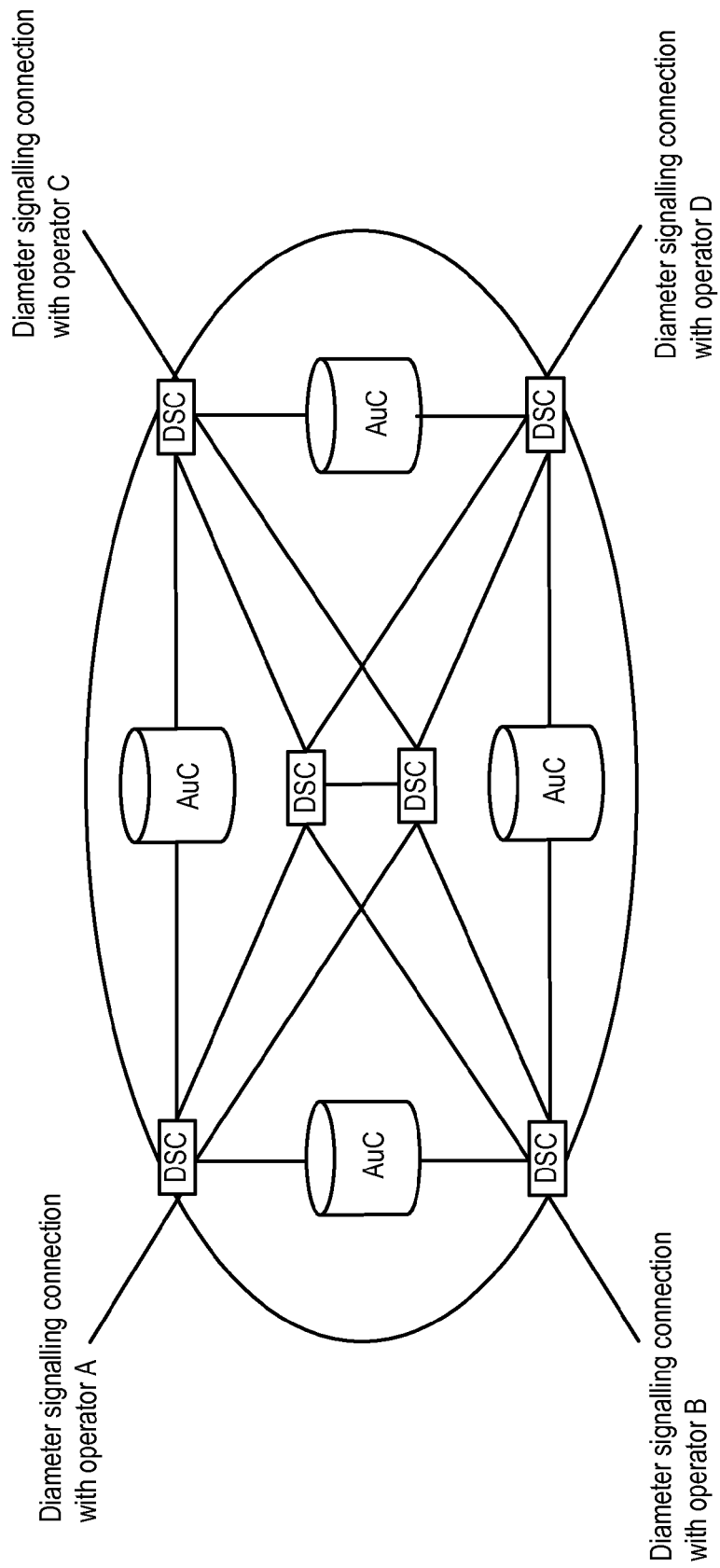
FIG. 12 is a block diagram illustrating example architecture of an independent authentication authority in accordance with the invention.

In the example architecture shown in FIG. 12, the independent authentication authority comprises four AuCs and a plurality of DSCs. The AuCs may each contain replica databases, different databases, or a combination thereof. The DSCs are provisioned to steer the routing of requests for authentication information received from networks, operated by different network operators, to the relevant AuC within the independent authentication authority.

In accordance with the invention discussed above, there are various provisions that the DSCs in the networks need to apply to their databases for reprogramming a UICC with a new IMSI when it is ported between networks.

In particular, a DSC of a network from which a UICC was ported (i.e. the "donor" network) needs to modify its database to indicate that the IMSI or key has been "ported out". The DSC in the network updates the IMSI to the new IMSI that is assigned by the recipient network to which the UICC was ported. The entry in the database that indicates the storage location for that key remains unmodified and will continue to point to the AuC of the donor network as storing the authentication key. In addition, the AuC of the donor network, which remains the AuC that stores the authentication key of the UICC, needs to assign the new IMSI to the authentication key. The old IMSI that was present in the UICC before the UICC porting process is either no longer used by the donor network or is reused for another subscriber to the network.

The DSC in the network to which the UICC was ported (i.e. the recipient network) needs to create an entry in its database for the new subscriber and marks this entry as "ported in". The entry created in the database also indicates the network in which the key is stored (for example, it may identify the "donor" network, such as the first network 502 or the independent authentication authority 1100) or the entry may simply indicate that the key is stored externally.

In the latter case, the intermediate node(s) (DSC(s)) 506 in the diameter signalling infrastructure will create an entry in their databases for this IMSI that associates the network code of the donor network and the network code of the recipient network for that (new) IMSI.

As noted above, these are various use cases in which the invention can be employed, which include attachment to a GSM/3G CS network, attachment to GSM/3G PS network (GPRS/UMTS), and attachment to EPS. The authentication process applied for these cases is based on an authentication key contained in a USIM of a UICC.

Other use cases in which the invention can be employed may include IMS registration, and Extensible Markup Language (XML) Configuration Access Protocol (XCAP) based user self-administration. The authentication process applied for these cases is based on an authentication key contained in a USIM of a UICC when the UICC does not contain an ISIM, an authentication key contained in an ISIM of a UICC when the UICC contains a ISIM, or an authentication key that is shared between a USIM and an ISIM of a UICC.

In addition, it will be appreciated that a Wireless Local Area Network (WLAN) may use a UICC for authentication and thus the invention could also be employed in a WLAN. WLAN is gaining increased relevance as access technology for different communication services such as internet access services and voice/video telephony services.

Currently, it is common practice that the network communications services (CS, PS, EPS) operator is also the operator offering the IMS services for its subscribers. This implies that this operator is the responsible authority for data contained in the USIM as well as data contained in the ISIM. Despite this common practice, it will be appreciated that IMS communication services for a subscriber may be offered by a different operator than the network communications services. In such a case, the USIM holds the authentication key that is used for CS access, PS access and EPS access to the network of a first operator and the ISIM holds the authentication key that is used for IMS registration in the network of a second operator. However, the subscriber may, at some stage, want to change to another network communications services operator. For this purpose, the IMSI in the USIM needs to be reprogrammed to point to the new operator for the network communications services. The ISIM does not need to be reprogrammed, as the subscriber remains a subscriber of the IMS operator.

Although the IMS operator is not the network communications services operator in this example, it may still own the authentication key contained in the USIM. This IMS operator may have purchased the UICCs with the authentication keys in the USIM and ISIM and operate a AuC for CS/PS/EPS access authentication as well for IMS registration authentication. The CS/PS/EPS access operator routes its request for authentication information towards the IMS operator, which is the authority that owns (and thus stores) the authentication key of the USIM according to the invention described above.

Thus, in summary, the invention separates authentication from UICC ownership. The invention allows UICC porting between operators without requiring replacement of the UICC and without requiring transfer of the authentication key of that UICC towards the operator to which the subscription is ported.

As described above, UICC porting is an increasingly important aspect of mobile communications network operation in view of the increasing number of mobile communications operators, both serving enterprise and residential users, but also serving devices used for machine-to-machine communications. UICC porting according to the invention is also useful as it allows the transfer between operators without the need to transfer SIM-based data (such as the address book, short messages (SMS), multimedia message (MMS), etc) to a new SIM card.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of operating a node for use by a first network, the first network applying an authentication process in order to allow a subscriber of the first network access to a network, wherein authentication information used in the authentication process is derived using a key associated with a subscriber identity of the subscriber, the method comprising the steps of:
   storing, in the node, information regarding the locations at which keys associated with subscriber identities are stored;
   receiving, in the node, a request for authentication information, the request indicating the subscriber identity to which the request for authentication information relates, the subscriber identity indicating that the subscriber subscribes to the first network;
   retrieving, by the node, information regarding the location at which the key associated with said subscriber identity is stored using said subscriber identity, said location being a location outside the first network; and
   routing, by the node, the request for authentication information according to the retrieved information regarding the location at which the key is stored.

2. The method of claim 1, wherein the request for authentication information is received by the node from an authentication node of the first network.

3. The method of claim 1, wherein the method further comprises:
   receiving, at the node, authentication information subsequent to the routing of the request for authentication information, and
   sending, by the node, the authentication information toward the network from which the request for authentication information was received.

4. The method of claim 1, wherein the node is located in the first network and the method further comprises:
   connecting the node to a key storage node that stores keys; and
   connecting the node to an authentication node that issues requests for authentication information for subscribers of the first network.

5. The method of claim 1, wherein the node is external to the first network and the method further comprises the steps of:
   connecting the node to a key storage node that is external to the first network and that stores keys for one or more subscribers of the first network; and
   receiving the request for authentication information from the first network.

6. The method of claim 1, wherein the request for authentication information is received by the node from a second network.

7. A method of operating an intermediate node for use in interconnecting multiple networks, a first network of the multiple networks applying an authentication process in order to allow subscribers of the first network access to a network, wherein authentication information used in the authentication process is derived using keys associated with subscriber identities of subscribers, the method comprising the steps of:
   storing, at the intermediate node, information regarding the locations at which keys associated with subscriber identities are stored, wherein for a subscriber identity that indicates that subscriber subscribes to the first network, the stored information regarding the location at which the key associated with the subscriber identity of the subscriber of the first network is stored comprises the identity of another one of the networks, in which the key for the subscriber of the first network is stored, the another one of the networks differing from the first network;
   receiving, at the intermediate node, a request for authentication information from the first network, the request indicating the subscriber identity to which the request for authentication information relates;
   retrieving, by the intermediate node, the identity of said another one of the networks in which the key is stored using the subscriber identity; and
   routing, by the intermediate node, the request for authentication information to said another one of the networks.

8. A node for use in a first network, the first network applying an authentication process in order to allow a subscriber of the first network access to a network, wherein authentication information used in the authentication process is derived using keys associated with subscriber identities of subscribers, the node comprising:
   a database configured to store information regarding the locations at which keys associated with subscriber identities are stored;
   a communications interface circuit configured to receive a request for authentication information, the request indicating a subscriber identity to which the request for authentication information relates, the subscriber identity indicating that the subscriber subscribes to the first network; and
   a processing circuit configured to use said subscriber identity to retrieve information regarding the location at which the key associated with said subscriber identity is stored from the database, said location being a location outside the first network, and to route the request via the communications interface circuit according to the retrieved information regarding the location at which the key is stored.

9. The node of claim 8, wherein the database is further configured to store the identity of a subscriber of a second network and the location within the first network at which the key is stored in the event that the key for the subscriber of the second network is stored in a location within the first network, and wherein the communications interface circuit is configured to receive a request for authentication information from the second network.

10. The node of claim 8, wherein the communications interface circuit is further configured to receive authentication information subsequent to the routing of a request for authentication information according to the retrieved information regarding the location at which the key is stored, and the processing circuit is configured to route the authentication information via the communications interface circuit toward the network from which the request for authentication information was received.

11. The node of claim 8, wherein the node is for use in the first network and is configured to connect to a key storage node that is configured to store keys and an authentication node that issues requests for authentication information for subscribers of the first network.

12. The node of claim 8, wherein the node is external to the first network and is configured to connect to a key storage node that is external to the first network that stores keys for one or more subscribers of the first network, wherein the communications interface circuit is configured to receive the request for authentication information from the first network.

13. An intermediate node for use in interconnecting multiple networks, a first network of the multiple networks applying an authentication process in order to allow subscribers of the first network access to a network, wherein authentication information used in the authentication process is derived using keys associated with subscriber identities of subscribers, the intermediate node comprising:
    a database configured to store information regarding the locations at which keys associated with subscriber identities are stored, wherein for a subscriber identity that indicates that subscriber subscribes to the first network, the stored information regarding the location at which the key associated with the subscriber identity is stored comprises the identity of another one of the networks, in which the key for the subscriber of the first network is stored, the another one of the networks differing from the first network;
    a communications interface circuit configured to receive a request for authentication information from the first network, the request indicating the subscriber identity to which the request for authentication information relates;
    a processing circuit configured to use the subscriber identity to retrieve the identity of said another one of the networks in which the key is stored from the database, and to route the request via the communications interface to said another one of the networks.

* * * * *